Aug. 16, 1949.    A. L. CHRISTENSON ET AL    2,478,895
HEAT TESTING APPARATUS
Filed Oct. 11, 1944    6 Sheets-Sheet 1
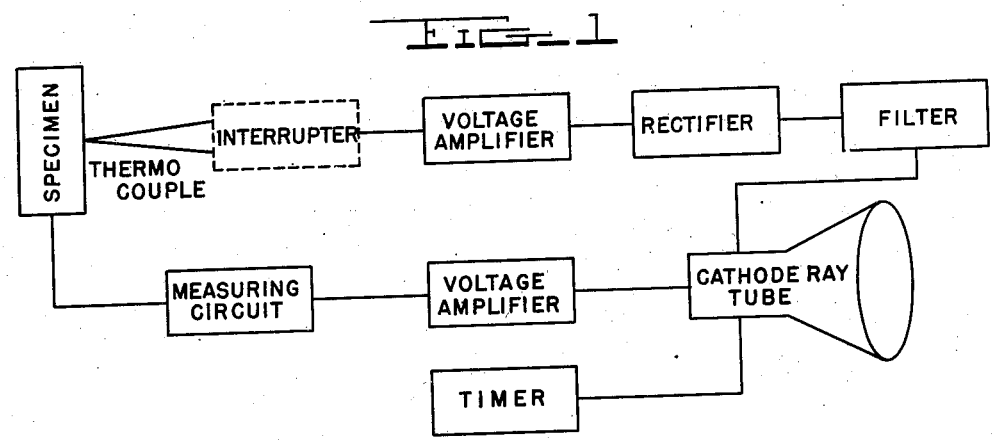
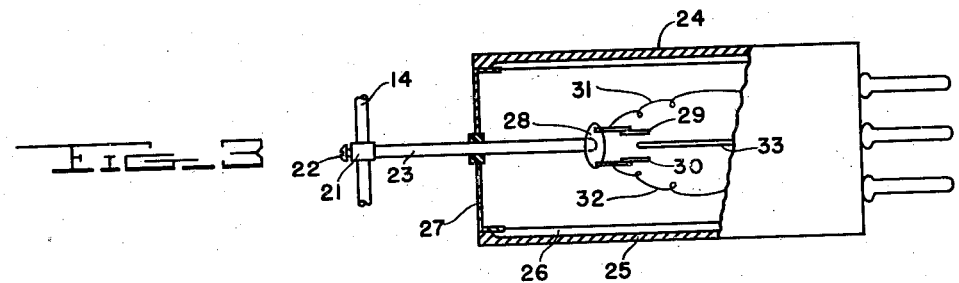
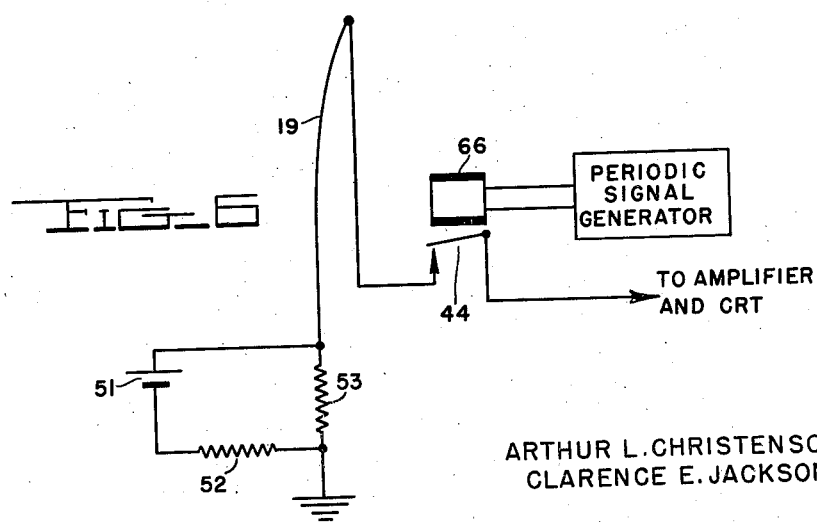
Inventors
ARTHUR L. CHRISTENSON
CLARENCE E. JACKSON
By W. Glenn Jones
Attorney

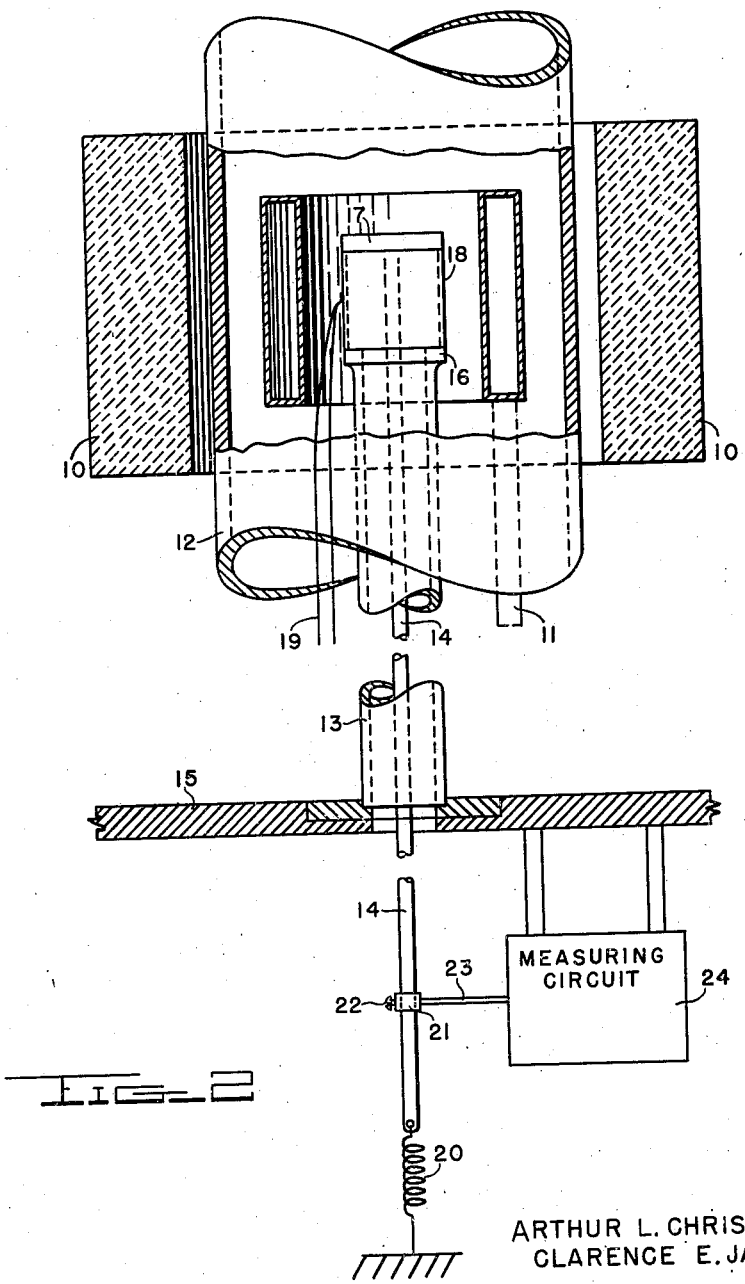

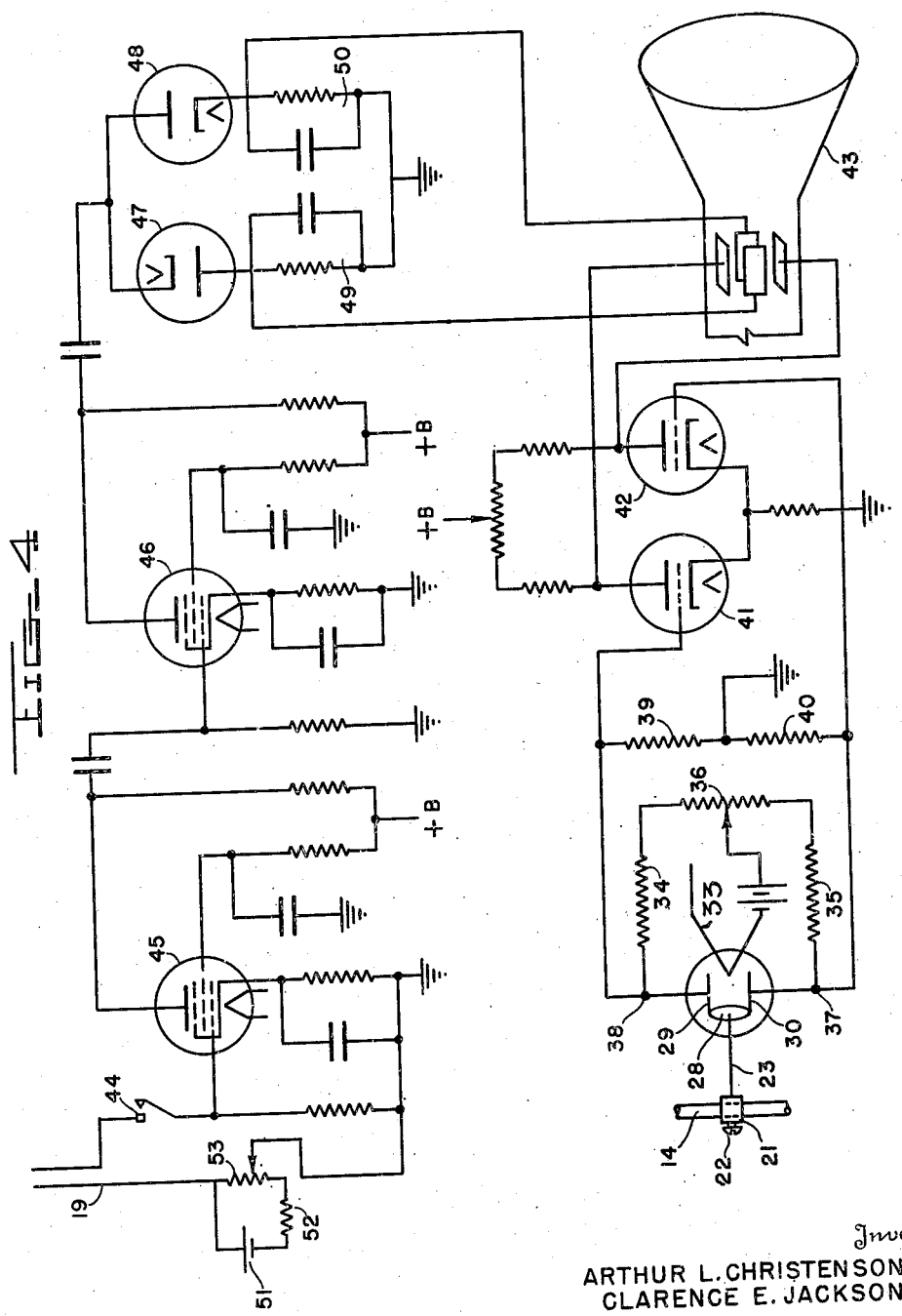

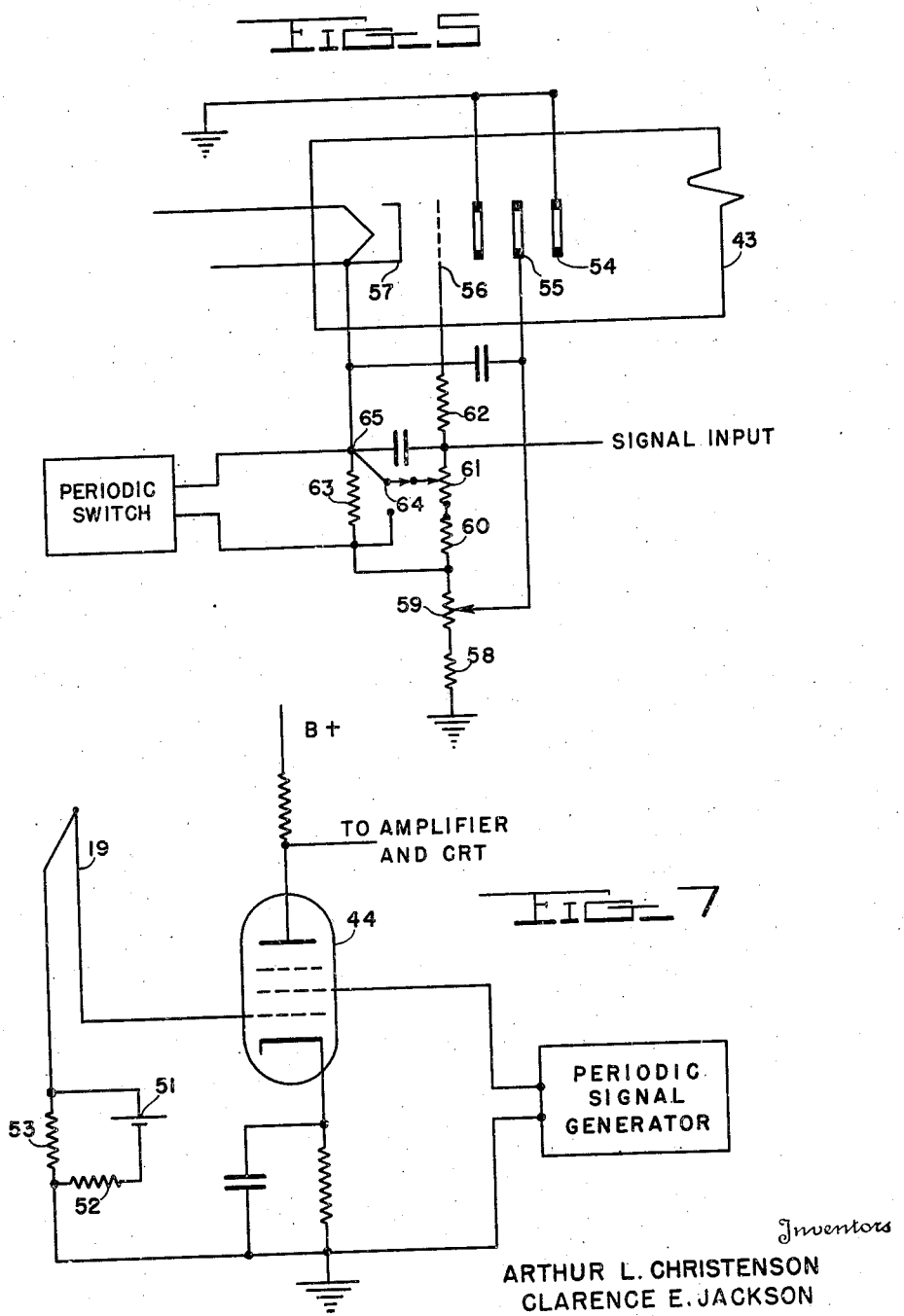

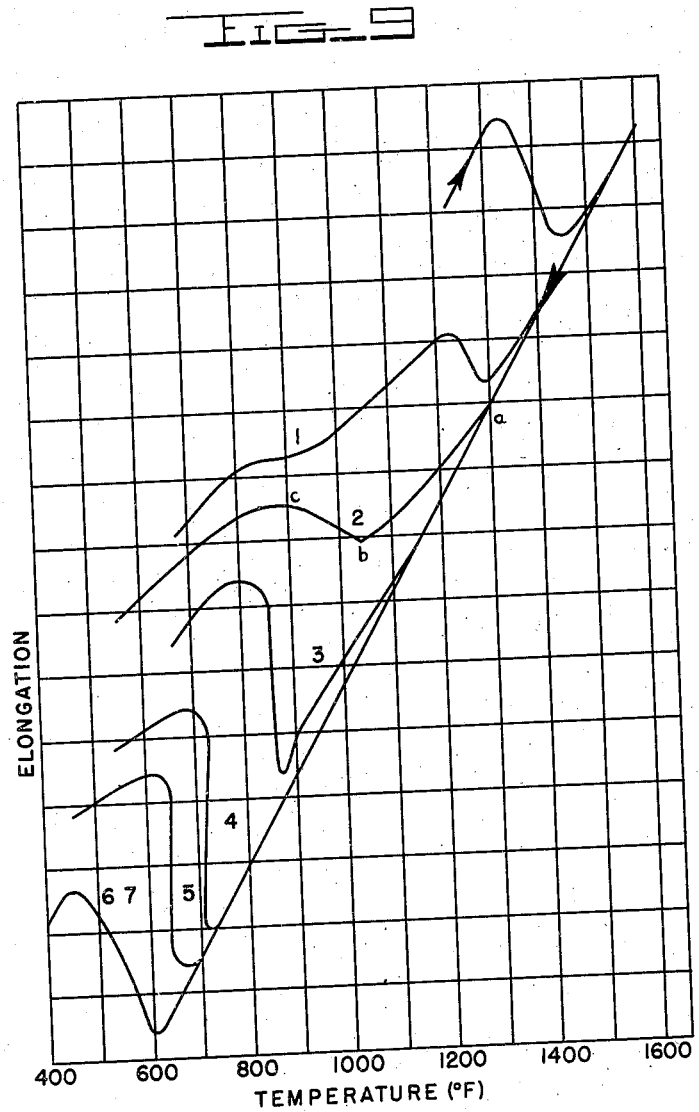

Patented Aug. 16, 1949

2,478,895

UNITED STATES PATENT OFFICE 2,478,895

HEAT TESTING APPARATUS

Arthur L. Christenson, Alexandria, Va., and Clarence E. Jackson, Takoma Park, Md.

Application October 11, 1944, Serial No. 558,234

6 Claims. (Cl. 73—16)

(Granted under the act of March 3, 1883, as amended April 30, 1928; 370 O. G. 757)

Our invention relates to heat testing apparatus for determining thermal characteristics of materials, and, more particularly, it relates to a high-speed sensitive dilatometer adapted to use in measuring the volume changes occurring in metals, such as steel, accompanying the transformations occurring within the metal during rapid heating and cooling.

Dilatometers or extensometers are not new to metallurgists and their use in the metallurgical art is highly developed. The apparatus in use today commonly have some means for causing the expansion or contraction of a specimen in the furnace to produce movement of an element outside of the furnace in a manner such that the amount of movement can be relatively easily measured. The measuring device in the simplest type of dilatometer comprises merely a strain gauge in which a needle indicates the relative amount of volume change of the specimen. In more elaborate apparatus, the specimen is made to deflect a mirror outside of the furnace, which deflection produces movement of a collimated light beam. The trace of the beam is photographed on a timed drum and the photograph subsequently converted into a temperature-volume plot. In either of these methods, critical points in the curves it is desired to derive are established by noting the occurrence of irregularities in the motion of the element displaced by the specimen.

Although both of the above types of apparatus are suitable for measuring slow changes of temperature or volume of a large specimen, because of inherent limitations due to inertia of the indicating parts of the apparatus, they cannot be adapted to the measurement of extremely rapid changes of temperature or volume of the specimen, such as might occur with rapid quenching of a heated specimen. Recently, the miles of welded seams which have been produced in shipyards and war plants have emphasized the need or more detailed and more rapid production of thermal data about the steels used.

It is the principal object of our invention to provide an apparatus which has a sufficiently speedy response and high enough sensitivity to measure the volume and temperature changes occurring in steel during rapid heating and cooling.

It is another object of our invention to provide an apparatus with which the time rate of volume and temperature changes occurring in steel accompanying the transformations which occur during a welding cycle can be followed.

A third object of our invention is to provide an apparatus with which volume, temperature and time rate of volume and temperature change of a specimen being heated or cooled at any rate can be visually indicated and recorded as a dynamic plot of the several variables.

A fourth object of our invention is to provide an apparatus in which the indicating device is substantially inertialess, thus making the apparatus extremely sensitive and responsive to the changes being measured.

Other objects and advantages of our invention will in part be obvious and in part appear hereinafter.

The heat testing apparatus or dilatometer of our invention accordingly comprises the features of construction, combinations of elements, and arrangements of parts, which will be exemplified in the construction hereinafter set forth and the scope of the invention will be indicated in the claims. For a complete understanding of the nature, construction and operation of our invention in its preferred and several alternative forms reference should be had to the drawings accompanying this specification in which, Figure 1 is a block diagram illustrating the interrelationship of the several elements of the apparatus;

Figure 2 is a view, partially in section, partially diagrammatic, of a mounted specimen, the mount, furnace, quenching fixture, thermocouple and measuring circuit;

Figure 3 is a view, partially in section, of a micrometer tube used in one embodiment of our invention to form two arms of a resistance bridge for measuring the dimensional change of a specimen;

Figure 4 is a circuit diagram illustrating the manner of converting the temperature and dimensional change of the specimen into electrical signals suitable for presentation on the screen of a cathode ray tube;

Figure 5 is a diagram illustrating one method of representing time on the screen of the cathode ray tube by interrupting the beam circuit at periodic intervals;

Figure 6 is a diagram showing one method for interrupting the thermocouple circuit in order to obtain therefrom a pulsating rather than a direct signal;

Figure 7 is a diagram of an alternative method of interrupting the thermocouple circuit to obtain therefrom a pulsating signal;

Figures 9 and 10 illustrate the curves derivable from traces like the one shown in Figure 8.

Figure 8:
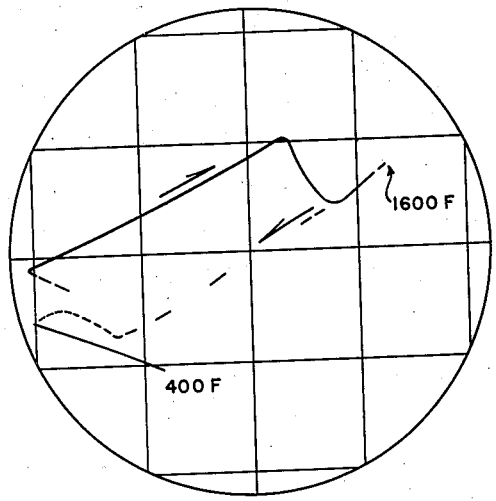
Figure 8 is a reproduction as a line drawing of a photograph of the trace which is the dynamic plot produced on the cathode ray tube screen by a specimen of SAE 4130 steel.

By referring to Figure 1, where the apparatus is shown schematically in the form of a block diagram, the principle of our invention can be readily understood. The expansion of the specimen in the furnace is caused to activate an electrical measuring circuit to generate a voltage proportional to the expansion. A preferred form of measuring circuit is a resistance, inductance or capacitance bridge the balance of which is upset by the expansion of the specimen. It could equally as well bring back toward a condition of balance an unbalanced bridge, but, as is well known to those similar with the art, in measurements of this sort it is generally preferable to start from a null, i. e., a balanced bridge. We have found in the operation of our apparatus that it is frequently necessary to start from a point of unbalance and permit the specimen to bring the bridge through the balance point to another unbalance. That is, the voltage obtained across the bridge starts at a given value, passes through zero and grows to another value of opposite polarity. The voltage obtained across the bridge is amplified and applied to one pair of the plates of the cathode ray tube.

In Figure 1 a specimen is shown associated with a thermocouple which may have an interrupter in its circuit to generate a pulsating signal from the direct thermoelectric signal. This signal is amplified, rectified, and filtered before being applied to one pair of plates of the cathode ray tube. For purposes of increasing the sensitivity, the circuit can be adjusted so that a full sweep across the cathode ray tube screen and return will correspond to the maximum temperature attained by the specimen as will be described in detail in connection with Figure 4.

The timer, represented by a separate block in Figure 1 may take any of several forms depending upon the service it is to perform, i. e., the rapidity of operation needed. It is connected to the control grid or modulating electrode of the cathode ray tube and acts to extinguish the beam at predetermined intervals. The operation of the timing device need only increase the modulating-electrode-to-cathode bias to beyond cut-off at intervals of desired frequency.

The dimensional change, temperature and time signals can all be applied to the cathode ray tube simultaneously, with the result that a trace or dynamic plot of curvilinear configuration consisting of a series of dots will be obtained. The path of the trace is determined by temperature and dimensional changes of the specimen. The spacing of the dots gives a measure of the passage of time and, hence, the time rates of temperature and dimensional change are indicated.

The manner of operation of our apparatus can be clearly understood by reference to Figures 2, 3, and 4, in which the elements shown in Figure 1 are shown in detail in one preferred form.

Referring to Figure 2, 10 is a furnace and 11 a quenching fixture both of which can be independently moved into or out of the positions shown. The dilatometer proper comprises members 12, 13, and 14 which comprise the specimen mount and enclosure and are preferably made of quartz or other non-expansible material. Since it is relative motion produced between members 13 and 14 which is a measure of the degree of expansion of the specimen it is essential that these members be substantially non-expansible. Member 13 is made cylindrical, of any desired length, and is firmly fixed at one end to a base member 15. At its other end it is preferably expanded into a small flange 16 which has its top surface ground to define a plane perpendicular to the longitudinal axis of the tube. Member 14 is made in the form of a rod having a flange 17 mounted to present its face perpendicular to rod 14 so that the faces of flanges 16 and 17 will define two parallel planes perpendicular to the axis of cylindrical member 13. When mounted, rod 14 is placed concentric with cylindrical member 13. A specimen 18 having a thermocouple 19 mounted thereon and made preferably in the form of a hollow thin-walled cylinder is placed between the flanges 16 and 17.

Rod 14 is made to extend beneath fixed base member 15 in order that a tension producing means such as a spring 20 can be attached to rod 14 to insure constant positive engagement between the faces of flanges 16 and 17 and specimen 18. Also somewhere on the extension of rod 14, connection is made to a measuring circuit which will generate a voltage proportional to the longitudinal displacement of the rod. The connection as shown here comprises simply a ring 21 large enough to pass the rod 14 and a set screw 22 to permit making adjustments by way of arm 23 in measuring circuit 24.

Measuring circuit 24, in the form of our apparatus shown, is a resistance bridge in which a micrometer tube takes the place of two arms of the bridge. The tube, illustrated in Figure 3, is the invention of Ross Gunn and is disclosed in detail in United States Patents 2,155,419 of April 25, 1939, 2,155,420 of April 25, 1939, Re. 21,361 of February 20, 1940 and Re. 21,372 of February 27, 1940. Briefly the form of tube we prefer comprises a metal case 25 protecting a glass envelope 26 which is sealed at its end by diaphragm 27. This construction allows a certain amount of play in arm 23 which passes through said diaphragm. Inside the tube, arm 23 carries an insulating support 28 on which are mounted two plates 29 and 30. Connections from the plates 29 and 30 are carried out to socket pins by means of leads 31 and 32. A single cathode 33 is the emitter and functions with both plates. It is apparent that a position of arm 23 can be found in which the two plate resistances of the tube will be equal. It is also apparent that since arm 23 is mounted in a flexible diaphragm, displacement thereof will move the plates and upset the equality of plate resistances.

In Figure 4, the micrometer tube is shown semi-pictorially as an element of a resistance bridge in which the two plate resistances of the tube constitute separate arms of the bridge. The remainder of the bridge is composed of resistors 34, 35 and balancing resistor 36. Within limits, depending upon the construction of the tube, the current passing between each plate and the cathode is a linear inverse function of the distance between the plate and the cathode. Thus, the voltage developed across the bridge is directly proportional to the longitudinal deflection of rod 14 or dimensional change of the specimen in the apparatus. Displacement of rod 14 alters the resistance ratios of the arms of the bridge, a voltage is generated across terminals 37 and 38 which is applied by way of resistors 39 and 40 to a single-stage, resistance-coupled, push-pull, linear amplifier comprising tubes 41 and 42.

Since the signal thus generated is proportional to the expansion of the specimen and depends upon the temperature to which the specimen is heated, presentation on the screen of the cathode ray tube is accomplished by applying the signal taken from the plates of tubes 41 and 42 to the vertical deflection plates of the cathode ray tube 43. The signal could just as well be plotted by applying it to the horizontal deflection plates of the cathode ray tube.

The voltage output of the bridge is of such magnitude, about one volt, that the drift ordinarily encountered in resistance coupled amplifiers is negligible. An alternating electromotive force could be applied to the bridge circuit rather than direct, thus permitting the use of a resistance-capacitance coupled amplifier stage and eliminating the possibility of drift. However, the problem of maintaining an alternating electromotive force of constant amplitude across the bridge is generally greater than is the problem of drift encountered in a resistance coupled amplifier of only one stage as in this case.

In Figure 4, the micrometer tube circuit is greatly simplified for the sake of clarity and because circuits for controlling its operation form no part of this invention. Various precautions for exact operation of the tube can be taken, for example, a small electromotive force and adjustable resistor can be included in the cathode circuit as an emission control; a hum control circuit and various adjusting and checking elements can also be included in the micrometer tube circuit.

The manner of putting the temperature signal on the cathode ray tube screen is also shown in detail in Figure 4. The temperature of the specimen is measured by a thermocouple 19 attached (e. g.; spot welded) to the surface of the specimen. In contrast to the one volt output obtainable from the micrometer bridge circuit, the maximum voltage output of the thermocouple is roughly twenty millivolts (0.020 volt). This establishes the necessity of using a resistance-capacitance coupled amplifier because the drift which would be encountered in amplifying twenty millivolts to two hundred volts, the voltage necessary to give proper deflection of the trace on the cathode ray tube screen, would alter any temperature calibration if a resistance coupled amplifier were to be used. Since a resistance-capacitance coupled amplifier will amplify only alternating or pulsating currents, provision has to be made for deriving an alternating or pulsating signal from the thermoelectric voltage.

In the diagram of Figure 4, the method of deriving a pulsating signal is indicated schematically merely by means of a pair of contacts 44. This make-break arrangement can take any one of several forms as illustrated in Figures 6 and 7. A conventional wide-band, two-stage, resistance-capacitance coupled amplifier comprising tubes 45 and 46 is sufficient to amplify the thermocouple voltage to that required by the cathode ray tube. The output of the amplifier is rectified by tubes 47 and 48, filtered by resistance-capacitance circuits 49 and 50 and applied to the horizontal deflection plates of the cathode ray tube 43.

Since the voltage output of the thermocouple is substantially a linear function of the temperature measured, the voltage output of the amplifier will be a linear function of the temperature if the amplifier is so constructed as to have linear voltage sensitivity in the range of thermocouple voltage.

The pulsating temperature signal obtained by the making and breaking of contacts 44 preferably has a relatively high repetition frequency, i. e., about 500 pulses per second. However, this is not a critical point for we have used pulse repetition frequencies as low as 60 per second and as high as 1000 per second. It is essential however that the filtering networks 49 and 50 match the pulse repetition frequency of the pulsating current in the sense that substantially all ripple be taken out of the rectified current and the voltage applied to the plates of the cathode ray tube be smooth.

Within the normal operating limits of a cathode ray tube, the deflection of the beam is a linear function of the voltage applied to deflection plates. Therefore, in the arrangement described in conjunction with Figures 2, 3, and 4, any increase or decrease in the temperature of the specimen will produce a proportional horizontal deflection of the cathode ray tube beam and any increase or decrease in the volume of the specimen will give a proportional deflection of the beam in the vertical direction. Thus, a direct dynamic plot of the temperature versus the volume characteristics of the specimen can be obtained on the screen and photographed for permanent record.

To improve the sensitivity of the temperature indication, a thermocouple biasing circuit comprising a cell 51, resistor 52, and adjustable resistor 53 is provided in order to make it possible during a single heating cycle of the instrument to have the cathode ray tube beam swing across the screen and back as the temperature indication. This device provides a doubly sensitive temperature indication in terms of degrees per inch of deflection of the beam. In setting this auxiliary thermocouple biasing circuit, cell 51 is oriented to give a potential of polarity opposite to that which will be generated by the heating of the thermocouple and of about one half the maximum value expected. During the heating of the specimen there is therefore, at first a gradual diminution of the amplitude of the voltage pulses to zero followed by a gradual enlargement of pulse amplitude with the pulses offset from the first by one half cycle. The result is a reversal in the direction of the deflection of the beam during a single heating cycle. The positioning controls of a cathode ray oscillograph and the amplifier can be used to start the trace on one side of the screen and to amplify the deflecting voltage so that reversal of the trace will occur at the other side of the screen. The circuits associated with the said controls are not shown for they are conventional and form no part of our invention.

It is also desirable to know the time rate at which the temperature and volume changes are taking place. The method of accomplishing this is to extinguish the cathode ray tube beam at pre-determined intervals of time and one simple method of so doing is shown in Figure 5.

In the diagram of Figure 5, which is a reproduction of the circuit used in the Dumont type 208 oscilloscope, 43 represents the end of the cathode ray tube of Figure 4, 54 is the modulating electrode, 55 the focussing electrode, 56 the control grid and 57 the cathode. Resistors 58, 59, 60, 61, 62 and 63 are the voltage dividers which bias the several electrodes of tube 43 to the appropriate values. To extinguish the beam, all that is necessary is to short circuit 63 thus reducing the accelerating potential to a value such that the beam will not be carried to the screen of the tube. The opening and closing of the short circuit can be accomplished mechanically or electronically and, consequently, the means for so doing has been indicated in the diagram simply as a periodic switch. The periodic switch can likewise be put in the circuit to make and break the line connecting points 64 and 65. This is substantially the same as switching on and off the beam switch found as one of the controls on all cathode ray oscilloscopes.

One satisfactory device we have used as a periodic switch comprises a simple metronome which in its harmonic oscillations is made to operate a light weight switch. It is satisfactory when interruptions of the beam are desired at intervals from about 0.3 second to about 3.0 seconds. For longer intervals we have used a manually operated telegraph key and the second sweep hand of an electric clock. Other conventional relatively long interval timing devices and relays are satisfactory and need not be described in detail or mentioned individually. For very short intervals such as 0.3 second or shorter some sort of automatic interruption such as a rotating wheel (sectoral) between the cathode ray tube screen and the camera or an electronic counting or timing circuit should be used for accurate spacing of intervals in the activation of the beam. Such circuits are quite conventional and need not be shown in detail inasmuch as they usually comprise multivibrators relaxation oscillators, or counting circuits in which a charge is built up stepwise on a condenser which controls the operation of a tube.

In Figures 6 and 7 we have illustrated specific methods of deriving a pulsating signal from the direct thermo-electromotive force generated by the thermocouple. Referring to Figure 6, it is seen that the contacts 44 of Figure 4 have been replaced by a relay 66 activated by a periodic signal generator. The periodic signal generator can be a sinusoidal, square, or sawtooth wave generator and the relay can be built to operate or open at a given voltage. By varying the length of the signal period or its amplitude, the pulse repetition frequency of the thermo-electric signal sent to the amplifier and cathode ray tube can be varied as desired.

In Figure 7 we have illustrated a second method of deriving a pulsating signal from the thermocouple in which contacts 44 of Figure 4 have been shown as a switch tube 44. The thermocouple voltage is applied to the control grid of the tube and a periodic signal is applied to the screen grid. The amplitude and frequency of the periodic signal can be adjusted so that the tube will be periodically cut off. Variation of the time the tube is cut off and the frequency of the cut off periods is controlled by the amplitude and frequency of the periodic signal which can be a sinusoidal, square, or a sawtooth wave.

Figure 10:
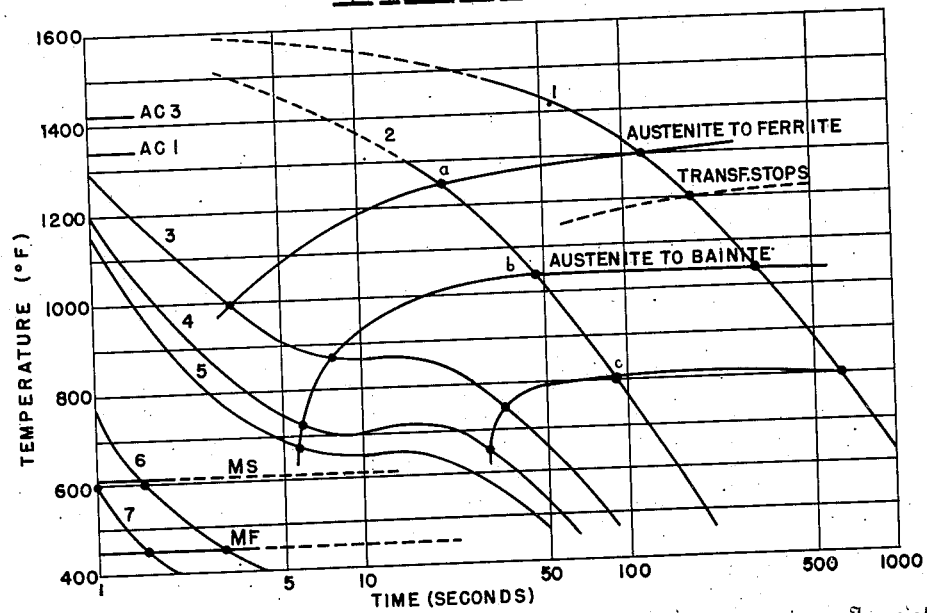

In Figures 8, 9, and 10, we have illustrated several types of data obtainable with our apparatus. Figure 8 is a reproduction as a line drawing of a photograph of the dynamic plot or trace of simultaneous volume, temperature and time signals made on a cathode ray tube screen during a run make on a specimen of SAE 4130 steel, the composition of which was: 0.29% carbon, 0.77% manganese, 0.30% silicon, 0.21% sulfur, 0.012% phosphorus, 0.20% molybdenum, 0.68% chromium, and 0.02% aluminum. In the figure illustrated, the sensitivity of the apparatus was so arranged that deflection of the beam across the screen in a horizontal direction represented a temperature change of 800° F. and the deflection of the beam across the screen in the vertical direction represented a length change of about 0.007 inch. The absolute change in length was not of great interest, inasmuch as only relative changes were needed in order to determine critical points in the temperature characteristics of the steel. The cathode ray tube beam was quenched at intervals of ½ second in order to time the cooling operation. The direction of motion of the beam is indicated by means of arrows drawn beside the trace. As appears from the reproduction of the photograph, the trace developed was a series of dots, the intervals between which represented time intervals. To obtain all the curves shown in Figures 9 and 10, a series of seven experiments had to be made using different rates of heating and cooling.

In Figure 9 there are illustrated the temperature-volume curves derivable from traces like the one reproduced in Figure 8. Since the screen of the cathode ray tube was calibrated in terms of temperature and volume, it was a simple matter to convert the trace shown in Figure 8 into one of the curves shown in Figure 9. The trace reproduced in Figure 8, corresponds to the curve marked 2 in Figure 9. The direction of progress of the heating cycle is indicated in Figure 9 by means of arrowheads. It will be seen that in being cooled from about 1600° F. to about 550° F. the specimen (curve 2, Figure 9) underwent two transformations, one at 1050° F. and a second at about 900° F. The rate of cooling is shown in Figure 10 as curve 2 in the temperature time plots there shown.

In Figures 9 and 10, a complete set of cooling curves for the specimen, summarizing the results of seven experiments at different cooling rates, are given. Corresponding critical points have been lettered a, b, and c on corresponding curves in Figures 8, 9, and 10. Critical points in the cooling of the sample in a series of experiments at different cooling rates were determined and curves defining the areas including the several grain structures in the steel have been drawn.

By means of our apparatus the volume and temperature changes occurring in steel cooling at rates approaching 1000° F. per second can be accurately detected and recorded as shown by the curves comprising Figures 8, 9, and 10. The probable error in determining the critical temperature of a specimen when the cooling rate is about 500° F. per second is ±20° F.

To obtain very high cooling rates resort must be had to the standard practice of using very thin sections of steel as samples. In Figure 2 we have shown our sample as a thin walled cylindrical member. Figure 2 is actually somewhat larger than full size for we have successfully used specimens ¾ inch in length and ½ inch in diameter having wall thickness of 1/16 inch. The high cooling rates are obtained by using a gas quenching fixture arranged to discharge gas at high velocity, through a large number of nozzles directly at the specimen. For a cooling gas we prefer helium but have used nitrogen and air. When using any gas containing oxygen, it is well to plate the specimen with copper to avoid having the specimen decarbonized if it is desired to use the same specimen repeatedly.

Our invention possesses a large number of advantages over conventional heat testing apparatus among which are:

It is possible to determine precisely the thermal characteristics of all types of steels so that their behavior in use can be predicted;

Critical temperatures of steels can be detected and measured with a high degree of precision;

Very small specimens of light section can be used so that extremely high heating and cooling rates are readily attainable;

Since the indications are electrical and the number of mechanical movements in the apparatus has been reduced to a minimum, the apparatus is substantially inertialess.

From the foregoing detailed description, the embodiments of our invention will be understood, but it is to be further understood that our invention is not restricted to the present disclosure to any extent otherwise than as restricted by the manner in which such invention is claimed.

The invention described herein may be manufactured and used by or for the Government of the United States of America for government purposes without the payment of any royalty thereon or therefor.

We claim:

1. A dilatometer comprising, in combination, a cathode ray oscillograph tube, means for heating a specimen, means for converting its expansion into an electrical signal suitable for application to one pair of deflection plates of the cathode ray tube, means for converting its temperature into an electrical signal suitable for application to a second pair of deflection plates of said cathode ray tube, and means for periodically extinguishing the beam of the cathode ray tube.

2. In a heat testing apparatus for metal or solid objects having means for changing the temperature of a specimen, in combination, a cathode ray oscillograph tube, a bridge circuit for converting dimensional change of a specimen into an electrical signal suitable for application to one pair of deflection plates of the cathode ray tube, a thermoelectric element for converting its temperature into an electrical signal suitable for application to a second pair of deflection plates of the cathode ray tube, and a relay for periodically extinguishing the beam of said tube.

3. A dilatometer comprising, in combination, a cathode ray oscillograph tube, means for changing the temperature of a specimen, a resistance bridge circuit for converting volume change of said specimen into an electrical signal suitable for application to one pair of deflection plates of the cathode ray tube, a thermoelectric element for deriving an electrical signal proportional to its temperature suitable for application to a second pair of deflection plates of the cathode ray tube, and a relay for periodcally extinguishing the beam of said tube.

4. In a dilatometer comprising a dilatable and contractible mounting means for a specimen and means for changing the temperature of the specimen, a cathode ray oscillograph, means for indicating the time rates of dimensional and temperature change of the specimen, said means comprising a bridge circuit and amplifier associated with said specimen mount and one pair of plates of the cathode ray tube, a thermoelectric element and amplfier associated with the specimen and the other pair of plates of the said cathode ray tube, a timing circuit to extinguish the beam periodically, said bridge circuit being operable to give an electrical signal proportional to the dimensional change of the specimen, said thermoelectric element being operable to give a signal proportional to the temperature of the specimen.

5. A dilatometer capable of indicating visually the time rates of dimensional change and temperature change of a specimen comprsing a dilatable and contractible mounting for said specimen, a cathode ray oscillograph tube, a bridge circuit and an amplifying circuit connecting said specimen to one pair of plates of the cathode ray tube in a manner to cause dimensional changes of the specimen to produce corresponding proportional deflections of the cathode ray tube beam of said tube, a thermoelectric element and interrupting, amplifying and filtering means to convert the direct electrical signal from said thermoelectric element into a signal suitable for application to a second pair of plates of the cathode ray tube, and a timing circuit for periodically extinguishing the beam of the cathode ray tube, whereby said apparatus operates to produce on said cathode ray tube screen a series of spots which by their horizontal and vertical displacements and spacing indicate the time rates of dimensional and temperature change of the said specimen.

6. A dilatometor capable of indicating visually the temperature and dimensions and time rates of temperature and dimensional change of a specimen, comprising, a cathode ray oscillograph tube, a dilatable and contractible mounting for said specimen, a resistance bridge circuit and an amplifyng circuit connecting said specimen to one pair of plates of the cathode ray tube so that dimensional changes of the specimen upset the resistance ratios of the bridge arms whereby a voltage proportional to the dmensional change of the specimen is produced, amplified and applied to one pair of plates of the cathode ray tube to produce therein a corresponding deflection of the cathode ray tube beam, a thermocouple to indicate the temperature of said specimen, an interrupter in the thermocouple circuit to convert its direct signal into a pulsating one, an amplifier to raise the intensity of the pulsating thermoelectric signal, a rectifier and filter to pass said amplified thermoelectric signal to a second pair of plates of the said cathode ray tube and a relay for periodically interrupting the cathode ray tube beam to indicate time.

ARTHUR L. CHRISTENSON.
CLARENCE E. JACKSON.

REFERENCES CITED

The following references are of record in the file of this patent:

UNITED STATES PATENTS

| Number | Name | Date |
|---|---|---|
| 1,363,267 | Porter | Dec. 28, 1920 |
| 1,753,486 | Travis | Apr. 8, 1930 |
| 1,912,213 | Nicolson | May 30, 1933 |
| 2,085,203 | Schlesman et al. | June 29, 1937 |
| 2,113,164 | Williams, Jr. | Apr. 5, 1938 |
| 2,113,376 | Janco | Apr. 5, 1938 |
| 2,142,802 | Riepert | Jan. 3, 1939 |
| 2,287,008 | Rockwell | June 16, 1942 |
| 2,291,561 | Reiss | July 28, 1942 |
| 2,300,999 | Williams | Nov. 3, 1942 |
| 2,306,137 | Pabst et al. | Dec. 22, 1942 |
| 2,336,286 | Owen | Dec. 7, 1943 |
| 2,351,572 | Kingston | June 13, 1944 |
| 2,362,589 | Simmons, Jr. | Nov. 14, 1944 |
| 2,380,565 | Wetherbee | July 31, 1945 |

FOREIGN PATENTS

| Number | Country | Date |
|---|---|---|
| 549,548 | Great Britain | Nov. 26, 1942 |